Figure 1:
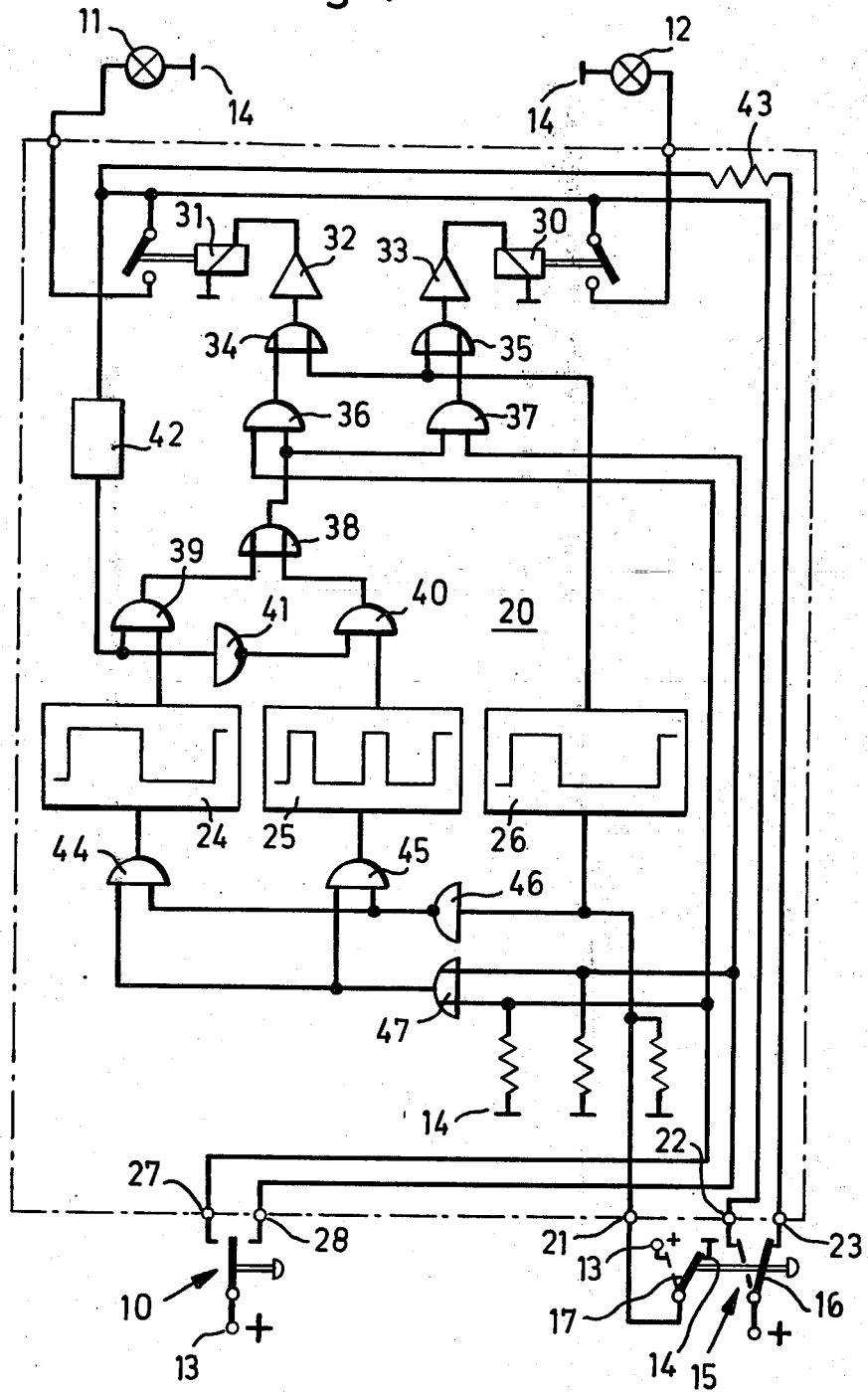

United States Patent [19]  [11]  4,325,007
Prohaska et al.  [45]  Apr. 13, 1982

[54] HAZARD WARNING CIRCUIT

[75] Inventors: Hans Prohaska, Bietigheim-Bissingen; Wolf Seitter, Marbach, both of Fed. Rep. of Germany

[73] Assignee: ITT Industries, Inc., New York, N.Y.

[21] Appl. No.: 146,410

[22] Filed: May 5, 1980

[30] Foreign Application Priority Data

May 21, 1979 [DE] Fed. Rep. of Germany ....... 2920602

[51] Int. Cl.³ .......................... B60Q 1/52; B60Q 1/38
[52] U.S. Cl. .................................. 315/200 A; 315/77; 315/226; 340/81 F
[58] Field of Search ..................... 315/77, 200 A, 226; 340/81 R, 81 F, 331; 307/10 LS

[56] References Cited

U.S. PATENT DOCUMENTS 3,740,714 6/1973 Ballou ........................... 340/81 F X
4,258,292 3/1981 Kassfeldt ....................... 315/200 A

FOREIGN PATENT DOCUMENTS 2145653 3/1973 Fed. Rep. of Germany ........ 315/77
2202770 7/1973 Fed. Rep. of Germany .... 340/81 R
 967959 8/1964 United Kingdom ............. 340/81 R Primary Examiner—Eugene R. La Roche
Attorney, Agent, or Firm—James B. Raden; William J. Michals

[57] ABSTRACT

A turn-signal flasher circuit for automotive vehicles wherein a turn-signal switch controls one of two turn-signal lamp circuits, and in which a hazard warning switch controls both lamp circuits simultaneously. A pulse generator controls the frequency of the flashing light output of the lamps. A second pulse generator, having a mark-to-space ratio which is substantially less than the mark-to-space ratio of the first generator, is responsive to the hazard warning switch to control frequency of the simultaneous flashing of both lamp circuits during the hazard warning operation of the flasher circuit. Accordingly, battery drain is reduced and a longer period of hazard warning operation is attainable.

2 Claims, 3 Drawing Figures

HAZARD WARNING CIRCUIT

The invention refers to a turn-signal flasher for the operation of a turn-signal system in motor vehicles according to the features of the preamble of claim 1.

Turn-signal systems for motor vehicles have been known in which the output signal of a single turn-signal flasher is utilized to control the turn-signal lamp circuits as well during turn-signal operation as also during hazard warning operation. The turn-signal flasher as a rule is thereby laid out in such a way that 90 pulses per minute are released in a light period of 50 percent of the cycle duration, which is regarded as optimal to distinguish the light signal easily during turn-signal operation. It has also been considered that during turn-signal operation fewer lamps are controlled than during hazard warning operation and that turn-signal operation normally is only switched on with running engine, so that the energy consumption is practically irrelevant. In contrast thereto during hazard warning operation essentially more lamps are switched on and the energy for the supply of these lamps is exclusively taken from the battery of the vehicle, because the electric generator then does not work. This means that during hazard warning operation the battery of the vehicle is heavily loaded and thus very quickly discharged.

It is an object of the invention to improve a turn-signal system for motor vehicles in such a way that the energy consumption during hazard warning operation is reduced, but the good recognisability during turn-signal operation is retained.

According to the invention this problem is solved in that the mark-to-space ratio of the output signal, i.e. the light period of the output signal referred to the cycle duration, is smaller with switched on hazard warning switch than with switched on turn-signal switch. Thus according to the invention during hazard warning operation the mark-to-space ratio, considering tolerances, is reduced to the present minimum rate of 30 percent prescribed by the law. The frequency of the output signal of the turn-signal flasher can thereby remain unchanged. However the turn-signal flasher can also be developed in such a way that the flashing frequency is additionally reduced. This results in a further but slight cut of the energy consumption, because the inrush current per time unit appears more rarely, when a lamp is switched on.

In a first embodiment of the invention the turn-signal has two clock generators operating independently of each other, whose pulse frequencies have differing mark-to-space ratios. During turn-signal operation the one clock generator is activated with bigger mark-to-space ratio, whereas during hazard warning operation the other clock generator is switched on with the smaller mark-to-space-ratio. It is conceivable to integrate additional clock generators with different mark-to-space ratios into the turn-signal flasher, whereby in dependence on the voltage of the supply voltage source the light period of the flashing signal is reduced step-by-step. In the future such embodiments will advantageously be used, when the turn-signal flasher is provided with an integrated circuit.

In another embodiment of the invention a series produced turn-signal flasher is preferably used with only one clock generator, whereby the mark-to-space ratio of this single clock generator is varied in dependence on the mode of operation switched on. This is possible with minimal efforts, because such turn-signal flashers only the usual charging circuit of one capacitor has to be changed.

Figure 2:
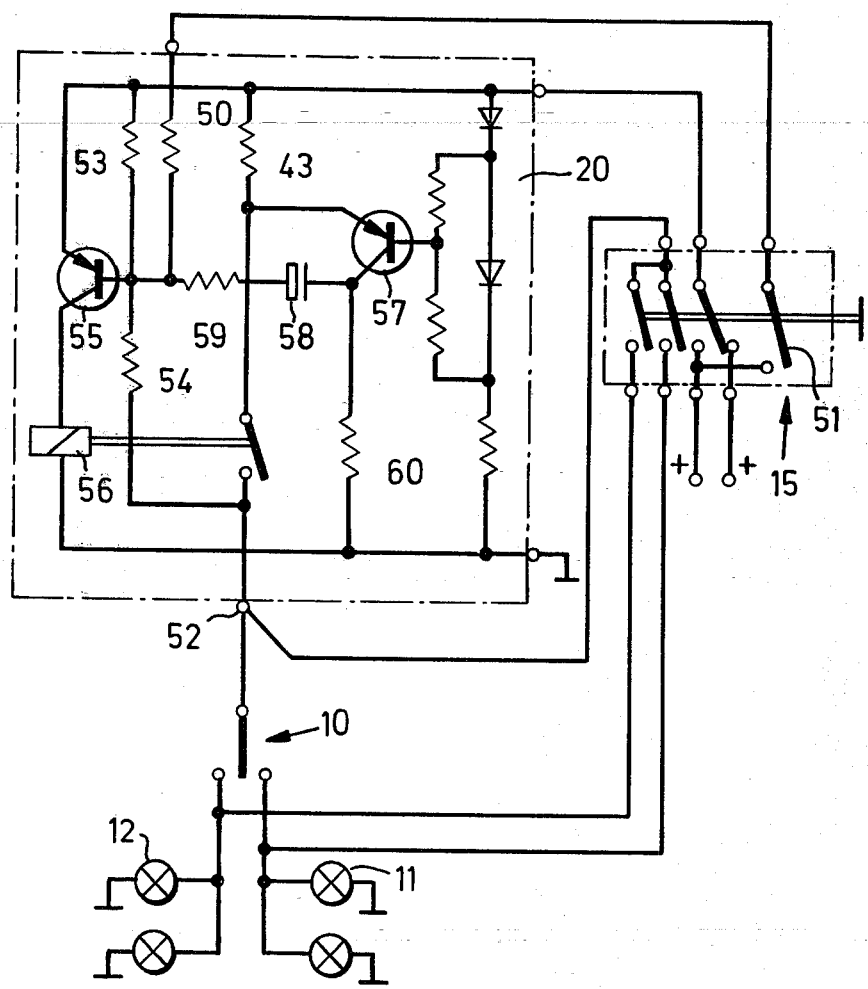
Figure 3:
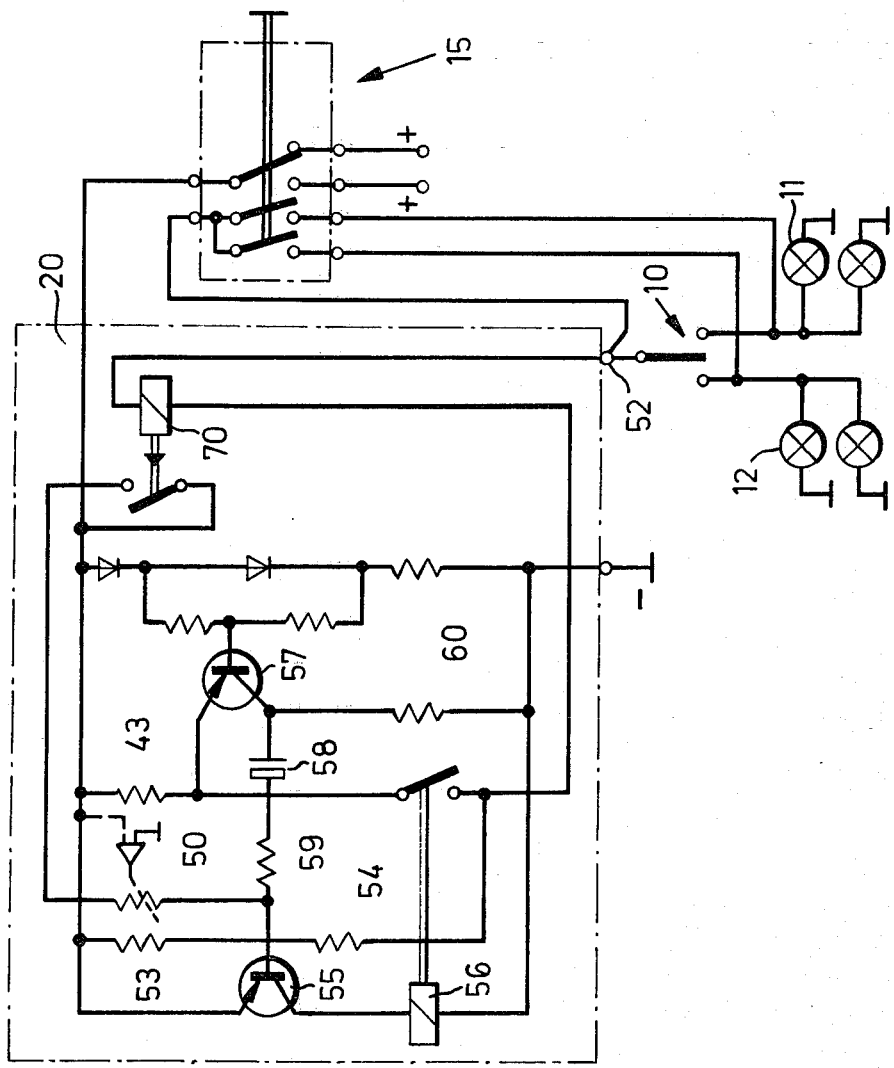

The invention is described below by way of an embodiment shown in the accompanying drawings, in which FIG. 1 is a schematic diagram of an embodiment with several clock generators, FIG. 2 is an embodiment with a single clock generator and FIG. 3 is an embodiment similar to FIG. 2.

In FIG. 1 the turn-signal switch whose movable bridging contact can be brought into a left-hand and a right-hand operating position, is designated by 10. In dependence on the position of the turn-signal switch the turn-signal lamps 11 and 12 on the left-hand or right-hand side of the vehicle are controlled. The changeover bridging contact of the turn-signal switch is applied to the positive pole 13 of a voltage source not shown in detail. The negative pole of this voltage source is designated by 14. A hazard warning switch 15 has two changeover bridging contacts 16 and 17 which are actuated simultaneously. Positive or negative potential is alternately conducted to a control input 21 of the turn-signal flasher as a whole designated by 20. Positive potential is alternately conducted to the turn-signal flasher via the input 22 or 23 through the other bridging contact 16 of the hazard warning switch 15.

Essential components of the turn-signal flasher 20 are three clock generators 24, 25, 26 which release upon control the respective pulse sequence shown. The frequency of the pulse sequence of the clock generator 24 amounts to about 90 pulses per minute at a mark-to-space ratio of 50%. The signal of said clock generator 24 is utilized to control the turn-signal lamp circuits during turn-signal operation as it is described later. The frequency of the signal of the clock generator 26 also amounts to 90 pulses per minute, the mark-to-space ratio, however, is reduced to 30%. This signal is used during hazard warning operation. The third clock generator 25 serves for the control of the turn signal lamp circuits during turn-signal operation when one turn-signal lamp has failed. The frequency of the signal of this clock generator 25 is twice as big as that of the other clock generators, the mark-to-space ratio can amount to 50% or be smaller too.

The circuits to the turn-signal lamps are switched via two relays 30 and 31 which are controlled via the amplifiers 32 and 33. To each amplifier an OR-gate 34, 35 is series connected via which either the pulse sequence of the clock generator 26 or the output signal of two AND-gates 36 and 37 respectively is connected through. These AND-gates are directly controlled via the turn-signal switch 10, so that in dependence on the switching position of this turn-signal switch 10 only one of the two AND-gates is connected through, whereas the other remains blocked. To the two AND-gates 36, 37 either the pulse sequence of the clock generator 24 or of the clock generator 25 is conducted via an OR-gate 38. To the OR-gate 38 two gates 39 and 40 are series connected which are directly and via an inverter 41 respectively controlled by a threshold switch 42, to which the voltage of a measuring resistor 43 in the turn-signal lamp circuit is conducted. Said measuring resistor 43 is only looped into the turn-signal lamp circuit in the shown rest position of the hazard warning switch 15.

The clock generator 26 is activated, when the hazard warning switch occupies the dotted switching position in which the input 22 is connected to positive potential. Two gates 44 and 45 are series connected to the clock generators 24 and 25 which are controlled via an inverter 46. Thus as soon as the clock generator 26 is activated, said gates 44 and 45 are blocked and the clock generator 24 and 25 is thus blocked too.

The gates 44 and 45 switched from the output of an OR-gate 47, whose two inputs are connected to the inputs 27 and 28 of the turn-signal flashers 20 which inputs may be acted upon by the turn-signal switch. This turn-signal flasher operates as follows:

When in the position shown of the hazard warning switch the turn-signal switch 10 is changed over into the one or other switching position, the two clock generators 24 and 25 are activated. Because during proper turn-signal operation the threshold switch only opens the gate 42, but blocks the gate 40 via the inverter 41, only the pulse sequence of the clock generator 24 is conducted to the two AND-gates 36, 37 via the OR-gate 38. In dependence on the switching position of the turn-signal switch 10 one of said AND-gates, e.g. the AND-gate 36 is opened, so that via the OR-gate 34 and the amplifier 32 the pulse sequence is conducted to the relay 31, which is thereby periodically energised and de-energised. Via the bridging contact 16 of the hazard warning switch 15 and the measuring resistor 43 as well as the switching contacts of the relay 31 the turn-signal lamps on the left-hand vehicle side are switched on and off 90 times per minute, whereby the mark-to-space ratio amounts to 50%. The light period and the dark period of the turn-signal lamps have approximately the same duration.

If one turn-signal lamp fails due to a defect the threshold switch 42 responds and blocks the gate 39, whereas the gate 40 is opened via the inverter 41. Thereby the pulse sequence of the lock generator 25 is connected through to the relay 31, so that now the turn-signal lamps light up with increased frequency. This mode of operation corresponds to that of known turn-signal flashers.

During hazard warning operation the clock generator 26 is activated via the bridging contact 17, whereby the clock generators 25 and 26 are simultaneously blocked via the inverter 46. The pulse sequence of the clock generator 26 is conducted to both OR-gates 34, 35, so that both relays 30, 31 are controlled via the amplifiers 32 and 33. Thus all turn signal lamps on the right-hand and left-hand side of the vehicle are flashing up, whereby according to the invention the mark-to-space ratio of the flashing signal is now reduced to 30%.

In this manner the energy consumption during hazard warning operation is thus essentially reduced in comparison to that of normal turn-signal operation, which is important on grounds of traffic safety.

In the embodiment according to FIG. 1 thus the turn-signal flasher has two clock generators 24, 26 operating independently of each other whose pulse sequences have differing mark-to-space ratios, whereby in dependence on the mode of operation switched on either the pulse sequence of the one clock generator or that of the other controls the turn-signal lamp circuits.

In the versions according to FIGS. 2 and 3 a conventional turn-signal flasher 20 is used whose function is described in detail by the German Pat. No. 24 25 409. In addition to the known turn-signal flasher only the resistor 50 is provided, whose function will be described later. Besides the in itself known hazard warning switch 15 compared to known versions has an additional bridging contact 51, via which the resistor 50 can be connected to the positive pole of the voltage source.

The turn-signal switch 10 is looped into the turn-signal lamp circuit in known manner and at the output 52 of the turn-signal flasher 20 alternately switches the signal on one of the turn-signal lamps 11, 12. When the turn-signal switch 10 is switched on, at first a control circuit for the transistor 55 becomes effective via the resistors 53 and 54 as well as via the turn-signal lamps 11 or 12. The transistor 55 becomes conductive, so that the relay 56 operates. Thus the turn-signal lamp circuit is closed via the measuring resistor 43. The voltage drop on the measuring transistor during proper turn-signal operation is sufficient to block the transistor 57. Thus the capacitor 58 charges via the resistor 53 and the resistor 59 as well as the resistor 60. The charging operation via this charging circuit determines the duration of the light period. As soon as the capacitor is recharged the transistor 55 blocks and the rely 55 is de-energised. Thus the transistor 57 becomes conductive simultaneously, because there is no longer a voltage drop at the measuring resistor 43. Now the capacitor 58 discharges via the resistors 53, 59 and via the collector-emitter space of the transistor 57 and the measuring resistor 43. This discharging operation determines the duration of the pulse interval. The other components of the turn-signal flasher 20 which are not described in detail serve for voltage and temperature compensation of the measuring stage with the transistor 57, which effect an increase of the frequency, if one of the turn-signal lamps fails.

In connection with the present invention the resistor 50, which is connected in parallel to the resistor 53 as soon as the hazard warning switch is actuated, is of significance. Thereby the charging circuit of the capacitor 58 is affected, for the connection in parallel of the two resistors 50 and 53 effects a reduction of the time determining resistor in this charging circuit. Thus the light period of the one clock generator is in dependence on the mode of operation by generally changing a switching path affecting the mark-to-space ratio. One could connect in parallel the resistor 50 also to the resistor 59 or to the resistor 60, but in this case it would not be possible so simply to loop this additional resistor 50 into the charging circuit via a further contact bridge of the hazard warning switch.

The embodiment according to FIG. 3 differs from that according to FIG. 2 only in that this additional resistor 50 is not connected via a further bridging contact of the hazard warning switch, but through a current relay 70. This current relay 70 is located in the turn-signal lamp circuit and is laid out in a manner, that it is only excited, when all turn-signal lamps light up. During normal turn-signal operation the relay remains in the shown switching condition and the resistor 50 does not affect the mark-to-space ratio of the output signal of this turn-signal flasher.

Besides in FIG. 3 it is indicated by dotted lines that the value of the resistor 50 is variable in dependence on the voltage of the supply voltage source. In this manner the light period of the output signal of the turn-signal flasher can be varied in dependence on the voltage of the vehicle battery, so that with decreasing battery voltage the light period is more and more reduced and thus the life of the battery is prolonged. Of course FIG. 3 only shows the idea on principle; other component and voltage-dependent components respectively can be used instead of the resistor 50.

Finally it is pointed out to the fact that the circuit arrangement can be further developed in such a way that the shorter light period in the hazard warning operation is only possible, when the vehicle generator does not operate. As long as the generator feeds the battery the mark-to-space ratio can also correspond to that in normal turn-signal operation.

All these functions can above all very simply be realised, when integrated circuits, especially microprocessors or microcomputers are used for the circuit design of the turn-signal flasher.

What is claimed is:

1. A turn-signal flasher circuit for automotive vehicles wherein a turn-signal switch controls one of two turn-signal lamp circuits, and in which a hazard warning switch controls both lamp circuits simultaneously, comprising a pulse generator for controlling the frequency of the flashing light output of the lamps during the turn-signal operation of the flasher circuit, and a second pulse generator having a mark-to-space ratio which is substantially less than the mark-to-space ratio of the first generator and responsive to the hazard warning switch for controlling the frequency of the simultaneous flashing of both lamp circuits during the hazard warning operation of the flasher circuit.

2. A turn-signal flasher circuit for automotive vehicles wherein a turn-signal switch controls one of two turn-signal lamp circuits, and in which a hazard warning switch controls both lamp circuits simultaneously, comprising a pulse generator for controlling the frequency of the flashing light output of the lamps, and means responsive to the hazard warning switch for controlling the frequency of the simultaneous flashing of both lamp circuits at a mark-to-space ratio which is substantially less than the mark-to-space ratio of the normal frequency of said flasher and during the hazard warning operation of the flasher circuit.

* * * * *